(12) United States Patent
Colignon

(10) Patent No.: US 7,596,942 B2
(45) Date of Patent: Oct. 6, 2009

(54) SYSTEM FOR ASSISTING REGENERATION OF POLLUTION MANAGEMENT MEANS FOR MOTOR VEHICLE ENGINE

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 218 days.

(21) Appl. No.: 11/571,252

(22) PCT Filed: Jun. 20, 2005

(86) PCT No.: PCT/FR2005/050460

§ 371 (c)(1),
(2), (4) Date: Dec. 22, 2006

(87) PCT Pub. No.: WO2006/005863

PCT Pub. Date: Jan. 19, 2006

(65) Prior Publication Data

US 2008/0196394 A1     Aug. 21, 2008

(30) Foreign Application Priority Data

Jun. 23, 2004   (FR) .................................. 04 06854

(51) Int. Cl.
*F01N 3/00* (2006.01)
(52) U.S. Cl. .............................. 60/295; 60/285; 60/286; 60/297
(58) Field of Classification Search .................... 60/280, 60/285, 286, 295, 297, 301, 311

See application file for complete search history.

(56) References Cited

U.S. PATENT DOCUMENTS 6,952,918 B2 * 10/2005 Imai et al. ..................... 60/295

(Continued)

FOREIGN PATENT DOCUMENTS

EP          0349788 A        1/1990

(Continued)

OTHER PUBLICATIONS

Bunting, A, "Springing the trap", Automotive Engineer, Professional Engineering Publishing, London, GB, vol. 25, No. 5, May 2000, pp. 73-74.

(Continued)

*Primary Examiner*—Binh Q Tran
(74) *Attorney, Agent, or Firm*—Nicolas E. Seckel

(57) ABSTRACT

The invention concerns a system for assisting regeneration of pollution management means (1) integrated in an exhaust line (3) of a diesel engine (4), wherein the engine (4) is associated with common ramp means (7, 8) injecting fuel into the cylinders thereof, based on at least one post-injection and adapted to implement, in isocouple, through modification of engine operation control parameters, at least two regeneration strategies called level 1 and level 2 strategies and a second regeneration strategy including level 1 strategies and a sequence alternating the level 2 and over-calibrated level 2 strategies, enabling different thermal levels to be achieved in the exhaust line. The invention is characterized in that it comprises means (8) for analyzing the loading state of the pollution management means and means (8) for comparing same to threshold values, to implement the first regeneration strategy for states with load lower than the threshold values or the second regeneration strategy for states with load higher than the threshold values.

15 Claims, 2 Drawing Sheets

U.S. PATENT DOCUMENTS

| | | |
|---|---|---|
| 7,086,220 B2 * | 8/2006 | Imai et al. .................. 60/274 |
| 7,104,050 B2 * | 9/2006 | Sato et al. .................. 60/295 |
| 7,159,384 B2 * | 1/2007 | Otake et al. ................ 60/277 |
| 7,325,395 B2 * | 2/2008 | Kuboshima et al. ......... 60/295 |
| 7,337,608 B2 * | 3/2008 | Gabe et al. ................. 60/286 |
| 2004/0000139 A1 | 1/2004 | Kawashima et al. |
| 2004/0035101 A1 | 2/2004 | Imai |
| 2004/0055285 A1 | 3/2004 | Rohr |

FOREIGN PATENT DOCUMENTS

| | | |
|---|---|---|
| EP | 1375877 A | 1/2004 |
| EP | 1386656 A | 2/2004 |
| EP | 1400663 A | 3/2004 |
| FR | 2908767 A1 | 12/2001 |

OTHER PUBLICATIONS

"Diesel fuel regeneration", Dieselnet Technology Guide, Jul. 2001.

* cited by examiner

SYSTEM FOR ASSISTING REGENERATION OF POLLUTION MANAGEMENT MEANS FOR MOTOR VEHICLE ENGINE

BAKGROUND ART

The present invention concerns a system for assisting the regeneration of depollution means integrated in an exhaust line of a motor vehicle diesel engine.

More particularly, the invention concerns such a system in which the engine is associated to common rail means for the supply of fuel to its cylinders, according to at least one post-injection.

Such a post-injection is, in a standard manner, an injection of fuel after the high dead center of the cylinder under consideration.

These supply means are adapted to implement, in iso-couple, through modification of parameters for controlling the operation of the engine, different regeneration strategies that make it possible to obtain different thermal states in the exhaust line.

Thus, for example, supply means implementing a first regeneration strategy according to a strategy called level 1 strategy and a second regeneration strategy according to a strategy called level 2 strategy and/or an over-calibrated level 2 strategy, have already been proposed.

Indeed, it is known that, to ensure the regeneration of depollution means such as a particle filter, the soot trapped therein is burned thanks to the thermal energy provided by the engine and to the exotherm obtained by the conversion of the HC and of the CO on means forming an oxidation catalyst placed, for example, upstream of the particle filter.

This combustion can be assisted by a catalyzing element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

However, in critical driving conditions, such as, for example, city driving or in traffic jams, the levels reached with standard regeneration strategies of the particle filter can become insufficient to ensure a correct regeneration of the filter, which can translate into regenerations that last very long and are thus highly fuel-consuming, or even incomplete.

SUMMARY OF THE INVENTION

Any strategy for the elevation of the thermal levels during those critical driving conditions makes it thus possible to ensure complete regenerations, to reduce the over-consumption caused by this regeneration of the particle filter, and above all, to increase the security margin with respect to the cracking or the breakage of these filters.

The objective of the present invention is to propose such a strategy.

To this effect, an object of the invention is a system for assisting the regeneration of depollution means integrated in an exhaust line of a motor vehicle diesel engine, in which the engine is associated with common rail supply means for the injection of fuel into the cylinders thereof, according to at least one post-injection, and adapted to implement, at constant torque, through modification of parameters for controlling the operation of the engine, at least two regeneration strategies, among which a first regeneration strategy comprising strategies called level 1 strategies and level 2 strategies, and a second regeneration strategy comprising level 1 strategies and a sequence alternating level 2 strategies and over-calibrated level 2 strategies, making it possible to obtain different thermal levels in the exhaust line, characterized in that it comprises means for analyzing the loading state of the depollution means and means for comparing this loading state with predetermined threshold values, to implement the first regeneration strategy for loading states under the threshold values or the second strategy for loading states above the threshold values.

According to other characteristics:
- the depollution means comprise a particle filter;
- the particle filter is catalyzed;
- the depollution means comprise an NOx trap;
- the fuel comprises an additive intended to be deposited, with the particles with which it is mixed, on the depollution means to facilitate their regeneration;
- the fuel comprises an additive forming NOx trap,
- the depollution means are impregnated with an SCR formulation, ensuring a CO/HC oxidation function;
- the engine is associated with a turbo-compressor;
- the loading states of the depollution means are determined from the head losses at the boundaries of the depollution means; and
- the loading states are determined from the counter-pressure at the inlet of the depollution means.

BRIEF DESCRIPTION OF THE DRAWINGS

The invention will be better understood by reading the following description given as an example only and made in reference to the annexed drawings, in which.

DETAILED DESCRIPTION OF THE PARTICULAR EMBODIMENTS

Figure 1:
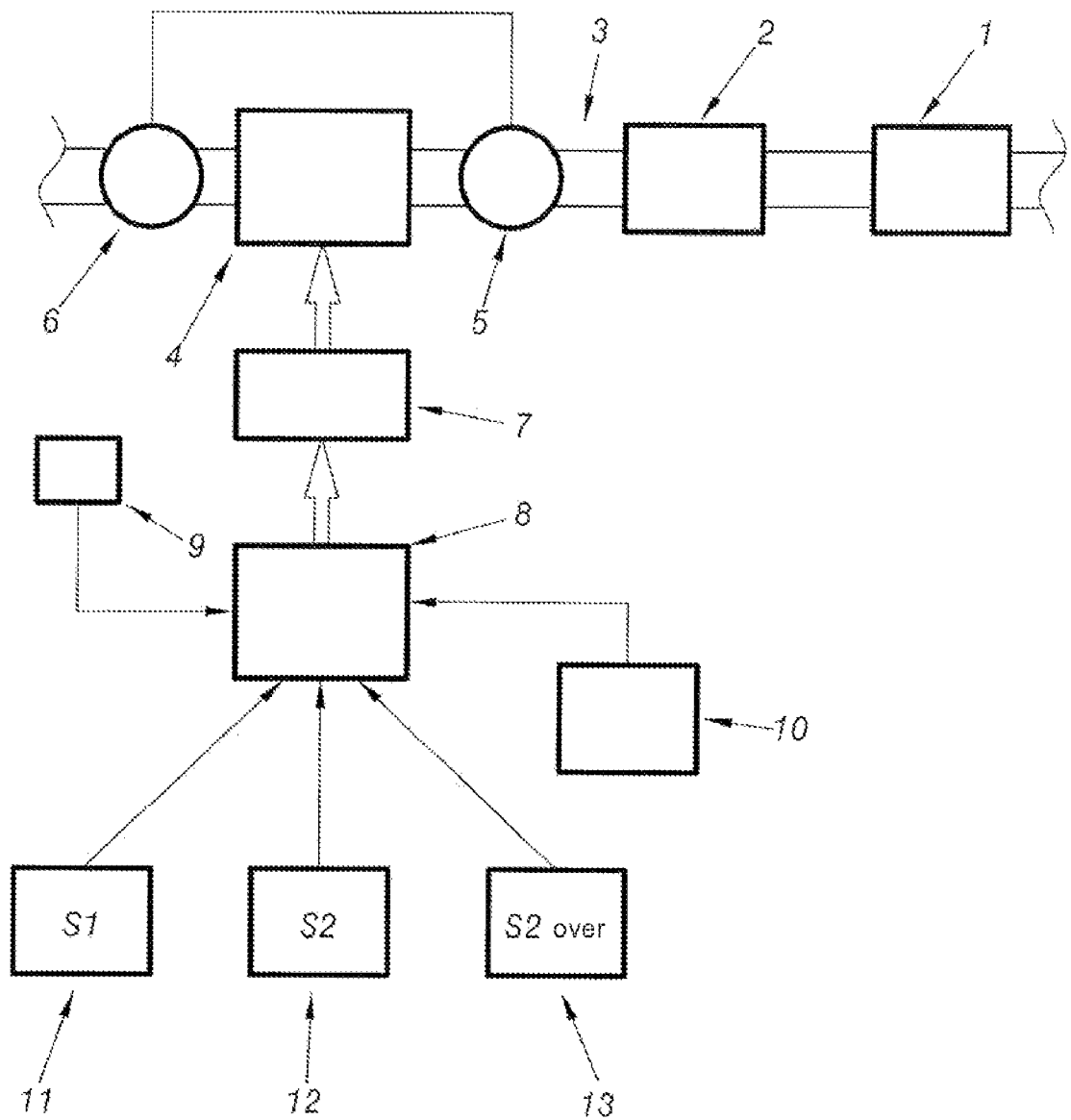
FIG. 1 is a synoptic schematic view illustrating the structure of an assistance system according to the invention.

Indeed, FIG. 1 shows a system for assisting the regeneration of depollution means designated by the general reference 1, associated with means forming oxidation catalyst, designated by the general reference 2 and placed in an exhaust line 3 of a thermal engine such as a motor vehicle diesel engine.

This engine is designated by the general reference 4 and can be associated, for example, with a turbo-compressor whose turbine portion 5 is associated with the exhaust line and whose compressor portion 6 is placed upstream of the engine.

The engine is associated with common rail means for the supply of fuel to the cylinders thereof, designated by the general reference 7, whose operation is controlled by a supervisor 8.

According to the invention, this system also comprises means for analyzing the loading state of the depollution means and means for comparing this loading state with predetermined threshold values, to control the operation of the engine.

The analysis means formed, for example, by the supervisor 8, are then connected to means for determining these loading states, designated by the general reference 9, supplying those to the supervisor 8, so as to enable the latter to compare them to threshold values such as supplied by generation means 10 comprising any appropriate means making it possible to establish these threshold values.

The determination of the loading state of the depollution means is indeed important.

This determination makes it possible to determine, for example, whether the depollution means are over-loaded with soot or plugged.

In the case where the depollution means are over-loaded with soot, there is indeed a risk that the depollution means, and in particular the particle filter, may crack during the next regeneration. It is thus necessary to regenerate this particle filter without damaging it, and to have temperatures as high as possible, to minimize the risk that the substrate of these means may crack.

When the filter is plugged, not only there is a risk that the filter may be damaged during the next regeneration, but also, there is a risk for the resistance of the engine.

Thus, it is appropriate to take into account these different problems to optimize the next regeneration of the filter.

In the system according to the invention, the loading state of the depollution means is determined to adapt the regeneration strategy.

Thus, this loading state can be determined from the loading loss measured at the boundaries of the depollution means, and in particular of the particle filter, in a standard manner.

These loading states thus determined are then compared to threshold values to determine the optimal strategy to be applied.

This loading state can be determined in different ways already known in the state of the art, for example, by using a pressure differential sensor at the boundaries of the depollution means, an absolute pressure sensor, at the inlet of the depollution means (counter-pressure), etc.

In fact, the supervisor and the common rail means for the fuel supply are adapted to drive the engine according to different regeneration strategies which make it possible to obtain different thermal levels in the exhaust line, and in particular, a first regeneration strategy comprising level 1 strategies, S1, as designated by the general reference 11 on this FIG. 1, and level 2 strategies, S2, as designated by the reference 12 on this Figure, and a second regeneration strategy comprising level 1 strategies, S1, and a sequence alternating level 2 strategies, S2, and over-calibrated level 2 strategies, S2 over, as designated by the general reference 13 on this Figure.

In fact, in the system according to the invention, and as a function of the results of the comparison performed by the means for comparing the loading states of the depollution means to predetermined threshold values, a regeneration strategy is implemented according to a level 1 and level 2 operation mode for loading states lower than the predetermined threshold values, and according to a level 1 operation mode associated with a sequence alternating level 2 and over-calibrated level 2 operation modes, for loading states higher than the predetermined threshold levels.

This makes it thus possible to maximize the chances of success of the regeneration, in particular in critical driving conditions, such as, for example, city driving or in traffic jams.

By way of example, one can go from the following criteria for a standard level 2 calibration for assisting the regeneration of a particle filter:
  maximal exhaust collector temperature=800° C.
  maximal catalyst exotherm=150° C.
  maximal catalyst outlet temperature=710° C.
  maximal catalyst internal temperature=760° C.
  minimal oxygen content of the gases at catalyst outlet=3%
  to the following criteria for an over-calibrated level 2 strategy:
  maximal exhaust collector temperature=830° C.
  maximal catalyst exotherm=200° C.
  maximal catalyst outlet temperature=730° C.
  maximal catalyst internal temperature=no maximal value
  minimal oxygen content of the gases at catalyst outlet=2%
With the following results:

| | |
|---|---|
| EUDC cycles | temperature at PF inlet of 600° C. reached in 200 sec. instead of 600 sec. with standard RG |
| | temperature at PF inlet of 650° C. reached in 220 sec. whereas this temperature is never reached with standard RG |
| City cycle | temperature at PF inlet of 500° C. reached in 100 sec. instead of 150 sec. with standard RG |
| | temperature at PF inlet of 550° C. reached in 105 sec. instead of 300 sec. with standard RG |
| | temperature at PF inlet of 600° C. reached in 150 sec. whereas this temperature is never reached with standard RG |

Figure 2:
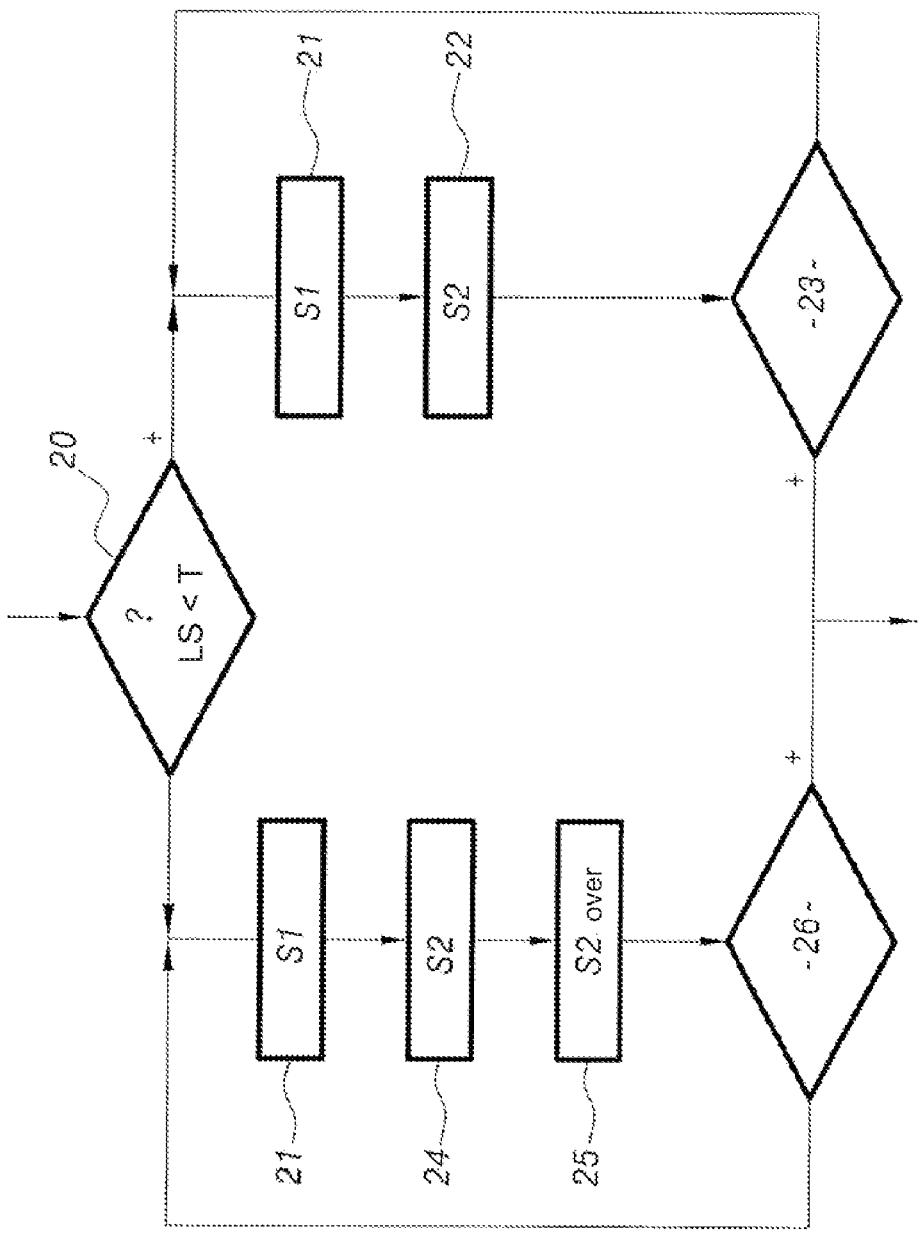
FIG. 2 illustrates the operation thereof.

FIG. 2 shows a flow chart illustrating the operation of this regeneration assistance system.

This operation begins with a phase of acquisition of the loading state of the depollution means from the different items of information mentioned above.

These loading states are subsequently compared by the supervisor, at 20, to threshold values.

If the loading states are lower than the threshold values, the regeneration strategy implements a level 1 strategy, at 21, associated with a strategy called level 2 strategy, at 22, until the end of the regeneration as determined at 23.

Conversely, if the loading states are higher than the threshold values, the supervisor implements a second regeneration strategy comprising a level 1 strategy, at 21, associated with a sequence alternating level 2 strategies and over-calibrated level 2 strategies, such as those designated by 24 and 25 on this Figure, until the end of the regeneration as detected at 26.

It is of course self-evident that different embodiments of this system can be envisioned, and that the depollution means can comprise a particle filter, such as, for example, a catalyzed particle filter or an NOx trap.

In addition, the fuel can also comprise an additive intended to be deposited, with the particle with which it is mixed, on the depollution means to facilitate their regeneration.

These depollution means can also be impregnated with an SCR formulation ensuring a CO/HC oxidation function in a standard manner.

Other means forming oxidation catalyst can be envisioned, and the depollution means and the means forming oxidation catalyst can be integrated into a single and same element, in particular on the same substrate.

By way of example, a particle filter integrating the oxidation function can be envisioned.

Similarly, an NOx trap integrating such an oxidation function can also be envisioned, whether it is additivized or not.

This oxidation and/or NOx trap function can be implemented, for example, by an additive mixed with the fuel.

The invention claimed is:

1. System for assisting the regeneration of depollution means integrated in an exhaust line of a motor vehicle diesel engine, in which the engine is associated with common rail supply means for the injection of fuel into the cylinders thereof, according to at least one post-injection, and adapted to implement, at constant torque, through modification of parameters for controlling the operation of the engine, at least two regeneration strategies, among which a first regeneration strategy comprising strategies called level 1 strategies and level 2 strategies, and a second regeneration strategy comprising level 1 strategies and a sequence alternating level 2 strategies and over-calibrated level 2 strategies, making it possible to obtain different thermal levels in the exhaust line, wherein said system comprises means for analyzing the loading state of the depollution means and means for comparing this loading state with predetermined threshold values, to implement the first regeneration strategy for loading states under the threshold values or the second strategy for loading states above the threshold values, wherein said level 2 strategies is calibrated using a maximal exhaust collector temperature of 800° C. and said over-calibrated level 2 strategies is calibrated using a maximal exhaust collector temperature of 830° C., and wherein said second regeneration strategy allows reaching a temperature at the particle filter inlet of 650° C. in 220 seconds in EUDC cycle whereas this temperature is never reached in EUDC cycle in the first regeneration strategy, and a temperature at the particle filter inlet of 600° C. in 150 seconds in City cycle whereas this temperatures is never reached in City cycle in the first regeneration strategy, so that regeneration with a higher temperature is performed, and the risk that the substrate may crack is reduced.

2. System according to claim 1, wherein the depollution means comprise a particle filter.

3. System according to claim 2, wherein the particle filter is catalyzed.

4. System according to claim 1, wherein the depollution means comprise an NOx trap.

5. System according to claim 1, wherein the fuel comprises an additive intended to be deposited, with the particles with which it is mixed, on the depollution means to facilitate their regeneration.

6. System according to claim 1, wherein the fuel comprises an additive forming NOx trap.

7. System according to claim 1, wherein the depollution means are impregnated with an SCR formulation, ensuring a CO/HC oxidation function.

8. System according to claim 1, wherein the engine is associated with a turbo-compressor.

9. System according to claim 1, wherein the loading states of the depollution means are determined from the head losses at the boundaries of the depollution means.

10. System according to claim 1, wherein the loading states are determined from the counter-pressure at the inlet of the depollution means.

11. System according to claim 1, wherein said level 2 strategies is calibrated using the following criteria:
maximal exhaust collector temperature=800° C.
maximal catalyst exotherm=150° C.
maximal catalyst outlet temperature=710° C.
maximal catalyst internal temperature=760° C.
minimal oxygen content of the gases at catalyst outlet=3%
and said over-calibrated level 2 strategy is calibrated using the following criteria:
maximal exhaust collector temperature=830° C.
maximal catalyst exotherm=200° C.
maximal catalyst outlet temperature=730° C.
maximal catalyst internal temperature=no maximal value
minimal oxygen content of the gases at catalyst outlet=2%.

12. System according to claim 11, wherein in the second regeneration strategy, a temperature at the particle filter inlet of 650° C. is reached in 220 seconds in EUDC cycle whereas this temperature is never reached in EUDC cycle in the first regeneration strategy, and a temperature at the particle filter inlet of 600° C. is reached in 150 seconds in City cycle whereas this temperatures is never reached in City cycle in the first regeneration strategy.

13. System according to claim 1, wherein in the second regeneration strategy, a temperature at the particle filter inlet of 650° C. is reached in 220 seconds in EUDC cycle whereas this temperature is never reached in EUDC cycle in the first regeneration strategy, and a temperature at the particle filter inlet of 600° C. is reached in 150 seconds in City cycle whereas this temperatures is never reached in City cycle in the first regeneration strategy.

14. System according to claim 12, wherein in the second regeneration strategy, a temperature at the particle filter inlet of 600° C. is reached in 200 seconds in EUDC cycle whereas it is reached in 600 seconds in EUDC cycle in the first regeneration strategy, a temperature at the particle filter inlet of 500° C. is reached in 100 seconds in City cycle whereas it is reached in 150 seconds in City cycle in the first regeneration strategy, and a temperature at the particle filter inlet of 550° C. is reached in 150 seconds in City cycle whereas it is reached in 300 seconds in City cycle in the first regeneration strategy.

15. System according to claim 13, wherein in the second regeneration strategy, a temperature at the particle filter inlet of 600° C. is reached in 200 seconds in EUDC cycle whereas it is reached in 600 seconds in EUDC cycle in the first regeneration strategy, a temperature at the particle filter inlet of 500° C. is reached in 100 seconds in City cycle whereas it is reached in 150 seconds in City cycle in the first regeneration strategy, and a temperature at the particle filter inlet of 550° C. is reached in 150 seconds in City cycle whereas it is reached in 300 seconds in City cycle in the first regeneration strategy.

* * * * *